(12) United States Patent
Pettigrew et al.

(10) Patent No.: US 8,959,362 B2
(45) Date of Patent: Feb. 17, 2015

(54) SYSTEMS AND METHODS FOR CONTROLLING FILE EXECUTION FOR INDUSTRIAL CONTROL SYSTEMS

(75) Inventors: William Robert Pettigrew, Salem, VA (US); Justin Brandon Chong, Salem, VA (US); Manas Ranjan Sahoo, Hyderabad (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/460,771

(22) Filed: Apr. 30, 2012

(65) Prior Publication Data

US 2013/0290729 A1 Oct. 31, 2013

(51) Int. Cl.
*G06F 21/00* (2013.01)
*G06F 21/51* (2013.01)
*G05B 19/048* (2006.01)

(52) U.S. Cl.
CPC .............. *G06F 21/51* (2013.01); *G05B 19/048* (2013.01)
USPC ................... 713/187; 713/176; 726/2; 726/3; 726/26

(58) Field of Classification Search
CPC .............................. G06F 21/51; G05G 19/048
USPC ............................ 713/176, 187; 726/2–3, 26
See application file for complete search history.

(56) References Cited

U.S. PATENT DOCUMENTS

| | | | |
|---|---|---|---|
| 5,774,652 A | 6/1998 | Smith | |
| 6,449,732 B1 * | 9/2002 | Rasmussen et al. | 714/12 |
| 6,694,434 B1 * | 2/2004 | McGee et al. | 713/189 |
| 7,246,002 B2 * | 7/2007 | Healy et al. | 701/100 |
| 7,577,848 B2 * | 8/2009 | Schwartz et al. | 713/187 |
| 8,015,791 B2 * | 9/2011 | Finkbeiner | 60/39.281 |
| 8,121,707 B2 | 2/2012 | Karaffa et al. | |
| 2008/0168564 A1 * | 7/2008 | Lerouge et al. | 726/26 |
| 2008/0175388 A1 | 7/2008 | Okabe et al. | |
| 2009/0049430 A1 * | 2/2009 | Pai et al. | 717/140 |
| 2009/0171479 A1 | 7/2009 | Oosako | |
| 2010/0185857 A1 * | 7/2010 | Neitzel et al. | 713/168 |
| 2010/0192208 A1 | 7/2010 | Mattsson | |
| 2010/0313264 A1 | 12/2010 | Xie et al. | |
| 2011/0040470 A1 * | 2/2011 | Qiu et al. | 701/100 |
| 2012/0226917 A1 * | 9/2012 | Wiseman et al. | 713/193 |
| 2013/0036311 A1 * | 2/2013 | Akyol et al. | 713/189 |
| 2013/0110298 A1 * | 5/2013 | Beveridge | 700/287 |

FOREIGN PATENT DOCUMENTS

| | | |
|---|---|---|
| EP | 0891611 | 10/1999 |
| WO | 2005069823 A2 | 8/2005 |

OTHER PUBLICATIONS

U.S. Appl. No. 13/460,721, filed Apr. 30, 2012, Sahoo et al.

(Continued)

*Primary Examiner* — Yin-Chen Shaw
(74) *Attorney, Agent, or Firm* — Fletcher Yoder, P.C.

(57) ABSTRACT

A system includes a controller configured to control a process, and store at least one binary file, wherein the at least one binary files is generated from at least one source file, wherein the at least one source file comprises instructions configured to be executed by a processor in the controller. The controller may also be configured to retrieve a whitelist file comprising a first hash key value derived from the at least one binary file, and execute an executable file based on the whitelist file, wherein the executable file comprises the source file.

19 Claims, 4 Drawing Sheets

(56) References Cited

OTHER PUBLICATIONS

U.S. Appl. No. 13/460,759, filed Apr. 30, 2012, Socky et al.
U.S. Appl. No. 13/460,779, filed Apr. 30, 2012, Chong et al.
U.S. Appl. No. 13/460,794, filed Apr. 30, 2012, Chong et al.
U.S. Appl. No. 13/460,801, filed Apr. 30, 2012, Chong et al.

\* cited by examiner

SYSTEMS AND METHODS FOR CONTROLLING FILE EXECUTION FOR INDUSTRIAL CONTROL SYSTEMS

BACKGROUND OF THE INVENTION

The subject matter disclosed herein relates to industrial control systems and, more particularly, to securing the operation of industrial control systems.

Industrial control systems, such automated power generation systems (e.g., wind, water, and gas turbine systems) and automated manufacturing systems (e.g., petroleum refineries, chemical manufacturing plants, and the like) are a common feature of modern industry. For such industrial control systems, an industrial controller may generally control the operation of the system. For example, certain devices in the industrial control system (e.g., sensors, pumps, valves, actuators, and the like) may be controlled by, and may report data to, the industrial controller. Furthermore, the industrial controller may execute instructions (e.g., firmware and/or applications) that may generally enable the industrial controller to control the operation of the industrial control system (e.g., a gas turbine system).

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a controller configured to control a process, and store at least one binary file, wherein the at least one binary files is generated from at least one source file, wherein the at least one source file comprises instructions configured to be executed by a processor in the controller. The controller may also be configured to retrieve a whitelist file comprising a first hash key value derived from the at least one binary file, and execute an executable file based on the whitelist file, wherein the executable file comprises the source file.

In another embodiment, A method includes determining an input binary by using an executable file, wherein the executable file is configured to be executed by a controller, calculating an input hash key value from the input binary, determining if the input hash key value is included in a whitelist, wherein the whitelist comprises a plurality of hash key values calculated from a plurality of authenticated binary files, and allowing the executable file to execute if the input hash key matches one of the plurality of hash key values in the whitelist.

In a third embodiment, a tangible, non-transitory, computer-readable medium includes instructions configured to be executed by a processor of an industrial controller. The instructions are configured to determine an input hash key value for an input binary file, and block execution of the input binary file if the input hash key value is not found in a whitelist, the whitelist comprising a plurality of hash key values.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
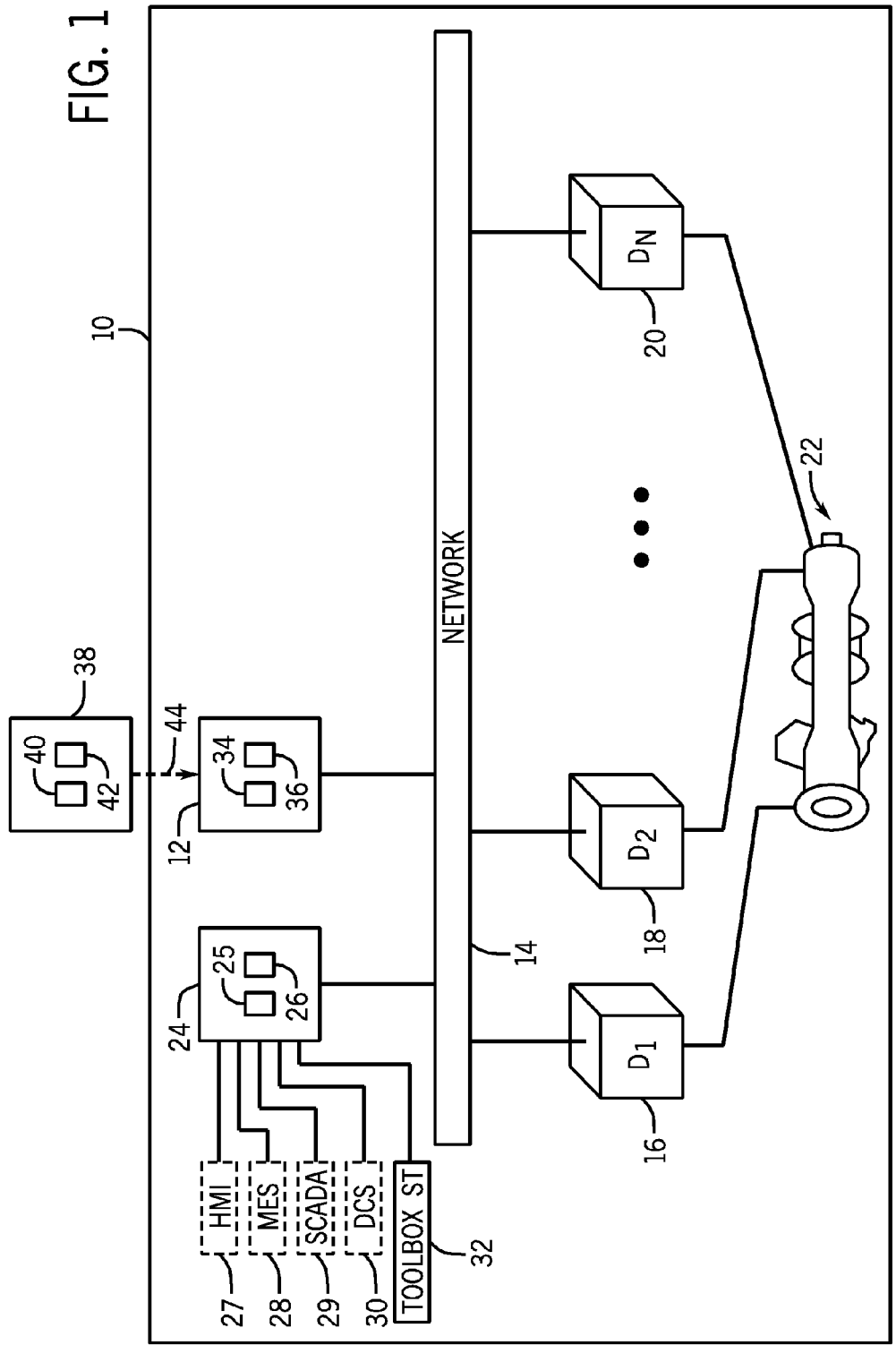
FIG. 1 is a schematic diagram of an embodiment of an industrial control system and a build system, in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Additionally, as used herein, the terms "executable file" and "binary file" may both generally refer to a computer-readable file that that includes instructions (e.g., binary instructions) that may be performed by a processor (e.g., the processor of an industrial controller). Furthermore, as used herein, the term "software developer" may generally refer to an organization which develops, maintains, and/or provides instructions in the form of source code and/or executable files to control the operation of industrial controllers. Also, as used herein, the term "whitelist" may refer to a file which includes a list identifying executable files that are authorized to run on an industrial controller. Additionally, the term "authorized" may be used herein to refer to an executable file that is verified to be from a trustworthy source (i.e., the software developer) and whose contents are verified as being the same as when it was provided by the trustworthy source.

As mentioned above, an industrial controller may generally execute instructions (e.g., base code, firmware, and/or applications stored in the form of one or more executable files) that may enable the industrial controller to control the operation of an industrial control system. These instructions may be initially loaded onto the industrial controller (e.g., into a memory or data storage component of the industrial controller) by the manufacturer before it is supplied to a customer. These instructions (e.g., base code, firmware, and/or applications) may also be subsequently updated (e.g., by the hardware manufacturer) and provided to the customer so that the instructions stored on the industrial controller may be updated to augment functionality and/or to fix errors or bugs in the instructions. Once the instructions in the memory of the industrial controller have been updated, then the industrial controller may execute these updated instructions to control the operation of the industrial control system.

However, under certain circumstances, it may be desirable for the industrial controller to verify that each executable file storing instructions for the industrial controller is authorized prior to execution. That is, it may be desirable to ensure that, prior to execution, each executable or binary file storing instructions for the industrial controller is verified as being provided from a trustworthy or reputable source (e.g., the software developer). Furthermore, it may be desirable to verify that each executable or binary file has not been altered since it was prepared by this trustworthy source (e.g., in transit between the hardware manufacturer and the customer). Moreover, it may be desirable to be able to perform this verification of executable files quickly and using limited resources (e.g., memory space and processor time), so as not to otherwise disrupt the operations of the industrial controller.

Accordingly, the presently disclosed systems and methods enable the verification of both the identity and the contents of each of the executable files before they are executed by the industrial controller in an efficient manner using a whitelisting system. That is, as discussed in detail below, presently disclosed embodiments utilize a secure whitelist file that may be provided by the software developer along with each release of executable files (e.g., each software installation or update release). This whitelist file generally includes a number of values, and each of these values may be associated with an authorized executable file. By verifying that each executable has an associated entry in the whitelist prior to execution, the presently disclosed embodiments provide the industrial controller with improved security to block or prevent the execution of undesired and/or malicious instructions (i.e., instructions from a non-trustworthy source).

As discussed in detail below, the presently disclosed whitelist file includes a collection of hash key values for the authorized executable files in a particular software release. That is, after each executable file is built, the executable file may be provided as input to a hash function and the hash key value output associated with that executable file may be stored in the whitelist file. The hash function may include a Cyclic Redundancy Check (CRC), a Message Digest (MD) algorithm, a Secure Hash Algorithm (SHA), or a combination thereof. Furthermore, the whitelist file may be securely provided to the industrial controller (e.g., encrypted prior to packaging and/or transport and decryption by the industrial controller). The industrial controller, prior to executing a particular executable file may also provide the particular executable file to the same hash function (e.g., cyclic redundancy check [CRC], MD5, SHA-1, or other hash function) and may search the whitelist file to determine if the hash key value output from the hash function is listed in the whitelist file. If the hash key value is located in the whitelist file, the industrial controller may conclude that the particular executable file is authorized (e.g., from a trustworthy source and unaltered since it was built) and proceed with executing the file. If, however, the hash key value is not located in the whitelist file, the industrial controller may block the execution of the particular executable file.

With the foregoing in mind, FIG. 1 is a schematic diagram illustrating an industrial control system 10. The illustrated industrial control system 10 includes an industrial controller 12 that may be coupled to a network 14 to control the operation of a number of field devices 16, 18 and 20. For example, the illustrated industrial controller 12 receives sensory data from a number of field devices 16, 18, and 20 (e.g., temperature sensors, pressure sensors, voltage sensors, control valves, actuators, or similar field devices for an industrial control system) via the network 14 to monitor and control the operation of a gas turbine system 22. In other embodiments, rather than a gas turbine system 22, the system being monitored and controlled by the industrial control system 10 may include, for example, any automated manufacturing systems (e.g., petroleum refinery systems, chemical production systems, or other automated manufacturing system) or automated power generation systems (e.g., power plants, steam turbine systems, wind turbine systems, gasification systems, and similar automated power generation systems). For example, in an embodiment, a gasification system may include a gasifier configured to gasify a carbonaceous feedstock to generate a synthetic gas, a gas treatment unit is configured to process the synthetic gas to remove undesirable elements (e.g., acid gases), a combustor configured to combust the synthetic gas to drive a turbine, and a generator coupled to the turbine configured to produce electrical power. In such an embodiment, the industrial controller 12 may monitor and control the various components of the gasification system (e.g., the gasifier, gas treatment unit, combustor, and turbine) using the field devices 16, 18, and 20.

For the illustrated industrial control system 10, the field devices 16, 18, and 20 are be communicatively coupled to the industrial controller 12 (e.g., via the network 14) while monitoring and controlling various aspects and parameters of the operation of the gas turbine system 22 (e.g., monitoring the temperature in a combustor of the gas turbine system, controlling the voltage output of an electrical generator coupled to a shaft of the gas turbine system, regulating a flow of a fuel into the combustor, controlling a valve to regulate a gas flow to a gas processor, controlling a steam input of a heat recovery steam generator (HRSG), and the like). It should be appreciated that the illustrated industrial control system 10 represent a simplified industrial control system, and that other industrial control systems may include any suitable number of industrial controllers 12, networks 14, networking devices, field devices, etc., to monitor and control various portions of any automated system 22. For example, the industrial control system may include a triple modular redundant (TMR) controller configured to provide redundant operations. The industrial control system may also include redundant controllers having a plurality of controllers (e.g., 2, 3, 4, 5 etc., controllers).

In the depicted embodiment, industrial controller 12 may use the network 14 for communicating with and controlling any one of the field devices 16, 18, or 20. For example, the industrial controller 12 may reside in an industrial plant and may be configured to adjust one or more process conditions related to the devices 16, 18, 20. The network 14 may be any electronic and/or wireless network suitable for enabling communications, and may include fiber media, twisted pair cable media, wireless communications hardware, Ethernet cable media (e.g., Cat-5, Cat-7), and the like. Further, the network 14 may include several sub-buses, such as a high speed Ethernet sub-bus suitable for connecting components of the industrial control system 10 at communication speeds of 100

MB/sec and upwards. Additionally, the network 14 may include an input/output (I/O) network, such as an I/O network conforming to the Institute of Electrical and Electronics Engineers (IEEE) 802.3 standard. The network 14 may also include an H1 network sub-bus suitable for connecting components of the industrial control system 10 at communications speeds of approximately 31.25 Kb/sec. The sub-buses may intercommunicate with each other, for example, by using linking devices or gateways, such as those gateways available under the designation FG-100 provided by softing AG, of Haar, Germany, and/or I/O packs available from General Electric Co. of Schenectady, N.Y. Indeed, a number of interconnected sub-buses of the network 14 may be used to communicate amongst the components of the industrial control system 10.

The industrial controller 12 includes memory 34 and processor 36 that may execute instructions (e.g., binary instructions in executable files) to generally control the operation of the industrial control system 10. For example, the memory 34 of the industrial controller 12 may include one or more files including binary instructions that may be performed by the processor 36 in order to control and monitor the field devices 16, 18, and 20 disposed within portions of the gas turbine system 22. These executable files may, for example, be initially installed in the memory 34 of the industrial controller 12 by the manufacturer of the industrial controller 12 before the industrial controller 12 is installed in the industrial control network 10. Furthermore, as discussed in detail below, the executable files stored in the memory 34 of the industrial controller 12 may occasionally be updated, for example, to augment the features of previous software versions as well as improve performance.

Also communicatively coupled to the industrial controller 12 (e.g., via the network 14 or another suitable network) is the device 24, having a memory 25 and a processor 26, which may host a human machine interface (HMI) system 27, a manufacturing execution system (MES) 28, a supervisor control and data acquisition (SCADA) system 29, a distributed control system (DCS) 30, or similar interface systems. In particular, in certain embodiments, the device 24 may host a configuration application or tool, such as ToolboxST 32, available from General Electric Co., of Schenectady, N.Y. In general, the aforementioned systems may provide one or more interfaces by which a user may monitor and control the operation of the industrial controller 12. For example, the HMI 27 and/or the ToolboxST 32 may provide a user interface through which various parameters of the industrial control system 10 (e.g., stored in the memory 34 of the industrial controller 12) may be forced or set. By further example, as discussed in detail below, the HMI 27 and/or the ToolboxST 32 may include an interface through which the various executable files stored in the memory 34 of the controller 12 may be updated to newer versions. In certain embodiments, the aforementioned systems may be hosted on a single device 24, while, in other embodiments, they may each be installed on one or more devices in the industrial control network.

As mentioned above, the memory 34 of the industrial controller 12 generally stores a number of executable files (e.g., binary files) to be executed by the processor 36. Also mentioned, the executable files stored in the memory 34 of the industrial controller 12 may occasionally be updated. For example, a software developer may produce and/or provide software updates for the executable files used by the industrial controller 12. For example, the software developer may have a build system 38 (e.g., a computer, laptop, or similar computing device), having a memory 40 and a processor 42, that may be used to build the executable files for later execution by the industrial controller 12 (e.g., once loaded into the memory 34 of the industrial controller 12), such as at the time of manufacturing or during a software update, as discussed below. That is, the memory 40 of the build system 38 may include a number of source files that may contain instructions in the form of human-readable code in a computer programming language. In order to produce an updated version of the executable files, the software developer may use the processor 42 to compile these source files, translating them into computer-readable (e.g., binary) instructions in the form of executable files for later execution by the processor 36 of the industrial controller 12. Additionally, in certain embodiments, once the executable files have been created, they may be packaged together (e.g., placed in an archive, compressed, encrypted, and the like). Then, the software developer may provide the updated executable files to the industrial controller 12, as represented by the dashed line 44 of FIG. 1. In certain embodiments, the software developer may place the updated executable files on a physical medium (e.g., an optical disc, a magnetic medium, a flash drive, or other similar data storage medium) that may be provided to (e.g., mailed to) a user of device 24. This user may, in turn, utilize the HMI 27 and/or ToolboxST 32 to transfer the contents of the physical medium to the memory 34 of the industrial controller 12. In other embodiments, the device 24 may, for example, be capable of establishing a network connection to build system 38 in order to download the executable files from the memory 40 of the remote build system 38 of the software developer.

Accordingly, as stated above, it may generally be desirable to ensure that the industrial controller 12 only executes authorized executable files. That is, regardless of how the executable files are provided by the software developer (e.g., via physical medium or network connection), it would be beneficial to verify that the executable file has been in no way modified since it was compiled by the software developer (e.g., the processor 42 of the build system 38 of the software developer). As such, the presently disclosed embodiments utilize a whitelist file that is provided by the software developer along with the executable files as a way of verifying that all of the executable files are authorized prior to execution. As discussed in detail below with respect to FIGS. 2 and 3, the whitelist file contains hash key values for each of the executable files such that the industrial controller 12 may efficiently and simultaneously verify the identity and contents of each executable file prior to execution.

Figure 2:
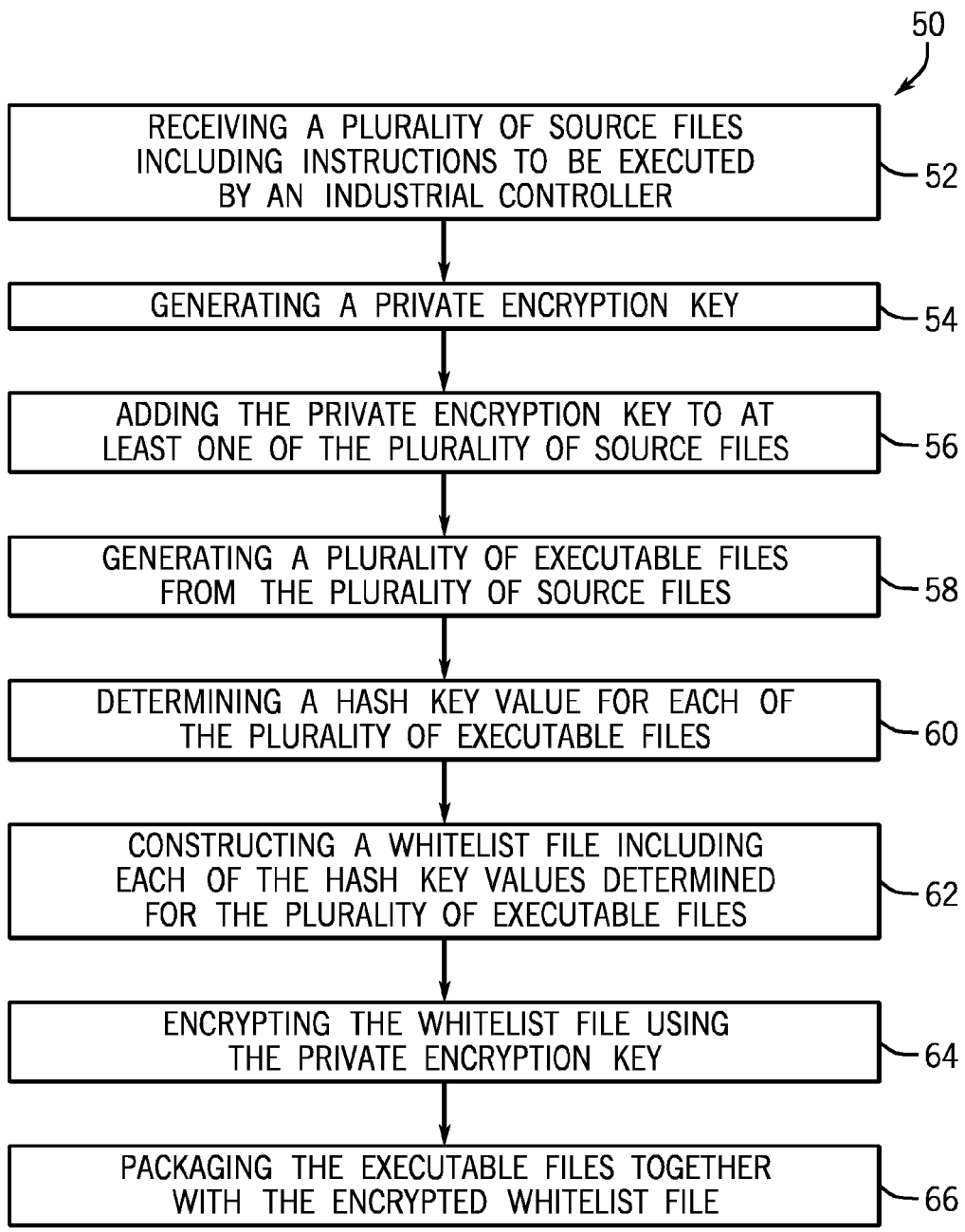
FIG. 2 is a flow diagram for an embodiment of a process by which the build system builds the executable files and whitelist for later use by the industrial controller, in accordance with aspects of the present disclosure.

FIG. 2 illustrates a flow diagram of a process 50 by which a device (e.g., the processor 42 of the build system 38) may prepare a software package including executable files and a whitelist identifying authorized executable files for the industrial controller 12. The illustrated process 50 begins with the build system 38 receiving (block 52) a plurality of source files that include instructions to be later executed by the processor 36 of the industrial controller 12. Next, the processor 42 of the build system 38 may generate (block 54) a private encryption key. In certain embodiments, the processor 42 may utilize one or more algorithms to produce random or pseudo-random characters or values for this private encryption key. In other embodiments, the build system 38 may include one or more random number generating devices that may be used to generate random or pseudo-random characters or values for the private encryption key. Once the private encryption key has been generated, the processor 42 may add (block 56) this private encryption key to at least one of the plurality of source files. For example, a source file associated with a startup executable file (e.g., an executable file that may usually run first when the industrial controller 12 is started) may include a variable that is defined but whose value is not initially specified by the software developer. Accordingly, the processor 42 may edit the source file such that the value of the variable is defined to be the private encryption key. By doing so, as discussed in detail below with respect to FIG. 3, when the industrial controller 12 executes the executable file that was compiled from this edited source file, the industrial controller 12 may have the variable set to the private encryption key (e.g., in order to later decrypt the whitelist file).

Next, the processor 42 of the build system 38 may generate a plurality of executable files from the plurality of source files. That is, the processor 42 may compile the source files in memory 40 of the build system 38 in order to output a number of executable files, which may also be stored in memory 40 of the build system. The processor 42 may then determine a hash key value for each of the plurality of executable files. That is, the processor 42 may apply a hash function to each of the executable files in order to determine a hash key value. A non-limiting list of example hash functions include: Cyclic Redundancy Check (CRC) 32, CRC 64, Message-Digest Algorithm (MD) 5, MD 6, Secure Hash Algorithm (SHA) 1, SHA 2, SHA 256, or SHA 512. It should be appreciated that the hash key value uniquely identifies an executable file based on a digestion of the contents of the executable file. This means that even a single bit change in the content of the executable file (e.g., caused by an error or corruption during transmission over a network connection) may produce a significantly different hash key value. It should also be appreciated that it may be substantially difficult or impossible to intentionally or accidentally produce two different executable files that will produce the same hash key value. As such, it should be appreciated that this essentially enables a processor (e.g., the processor 34 of the industrial controller 12) to quickly verify both the identity and the contents of an executable file by comparing hash key values.

Next, the processor 42 may construct (block 62) a whitelist file including each of the hash key values determined for the plurality of executable files. For example, the processor 42 may create a new file and populate the file with a delimited list of the determined hash key values for the executable files previously compiled by the processor 42. In certain embodiments, the whitelist file may be constructed as an Extensible Markup Language (XML) file. Once the whitelist file has been created, the processor 42 may then encrypt (block 64) the constructed whitelist file using the private encryption key determined in block 54. For example, the processor 42 may use an Advanced Encryption Standard (AES) algorithm, a Data Encryption Standard (DES) algorithm, Pretty good privacy (PGP) algorithm, or other suitable data encryption algorithm. Then, in certain embodiments, the processor 42 may package (block 66) the executable files together with the encrypted whitelist file. That is, the processor 42 may combine the executable file and the encrypted whitelist file into a single archive or compressed file for distribution to the industrial controller 12. In other embodiments, the build system 38 may make the whitelist file available to the industrial controller 12 and/or device 24 for eventual use by the processor 36 of the industrial controller 12.

Figure 3:
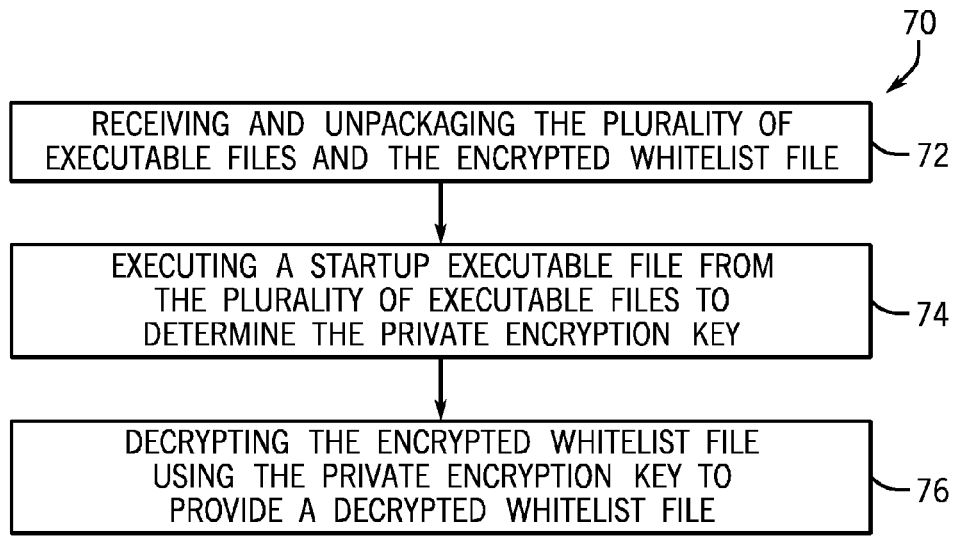
FIG. 3 is a flow diagram for an embodiment of a process by which the industrial controller receives and decrypts the whitelist, in accordance with aspects of the present disclosure.

FIG. 3 illustrates a flow diagram for an embodiment of a process 70 by which a processor 36 of the industrial controller 12 receives and decrypts the whitelist file. The process 70 may begin with the processor 36 of the industrial controller 12 receiving and unpackaging (block 72) the plurality of executable files and the encrypted whitelist file. As mentioned above, the HMI 27 and/or ToolboxST application 32 of the device 24 may assist the industrial controller 12 in receiving and/or unpackaging the plurality of executable files from the software developer (e.g., from build system 38 via physical medium or a network connection). The process 70 continues with the processor 36 of the industrial controller 12 executing (block 74) a startup executable file which may include the private encryption key, as discussed in blocks 64 and 54 of FIG. 2. Next, the processor 36 of the industrial controller 12 may decrypt (block 76) the encrypted whitelist file using the private encryption key in order to provide a decrypted whitelist file (e.g., in the memory 34 of the industrial controller 12). It should be appreciated that, while the actions described in block 72 may generally only be performed during an update of the industrial controller 12, in certain embodiments, the actions described in blocks 74 and 76 may also be performed, for example, during reboots of the industrial controller 12.

Figure 4:
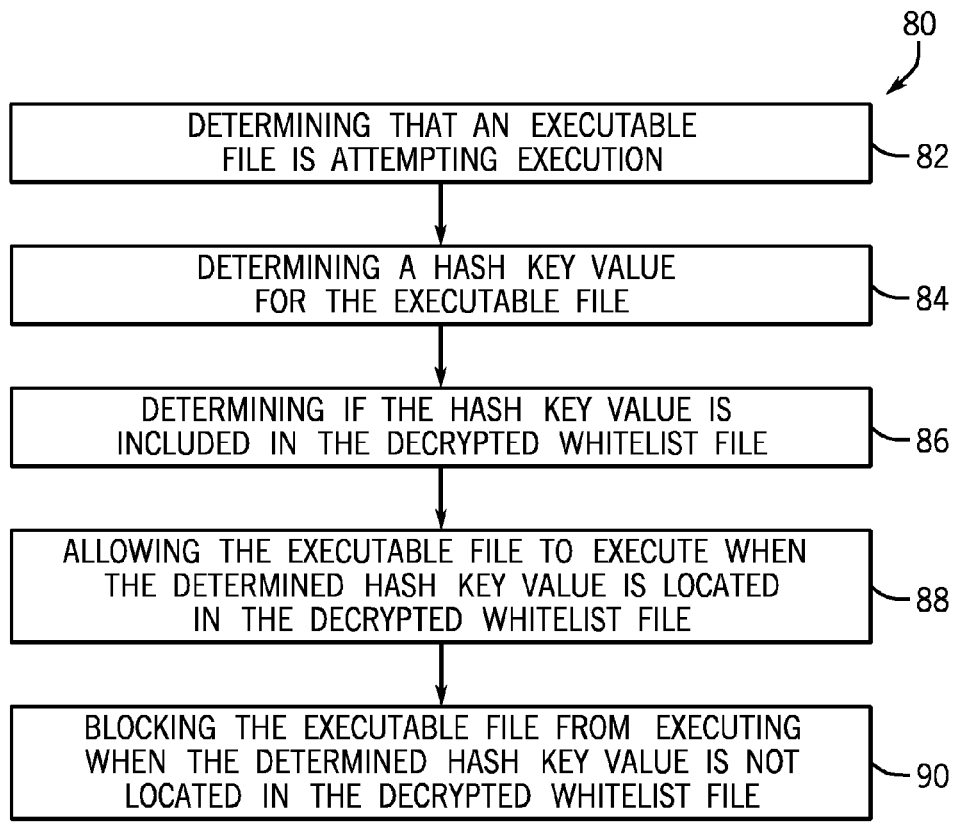
FIG. 4 is a flow diagram for an embodiment of a process by which the industrial controller uses the decrypted whitelist to verify an executable file prior to execution, in accordance with aspects of the present disclosure.

FIG. 4 illustrates a flow diagram for an embodiment of a process 80 by which a processor 36 of the industrial controller 12 may use the whitelist to verify that an executable file is authorized prior to execution. The process 80 begins with the processor 36 determining (block 82) that a particular executable file is attempting execution. The processor 36 may then determine (block 84) a hash key value for the executable file that is attempting execution. It should be appreciated that the processor 36 will apply the same hash function as was used to determine the hash key values during the construction of the whitelist file (e.g., discussed in block 60 of FIG. 2). The process 80 continues with the processor 36 determining (block 86) if the hash key value is included within the decrypted whitelist file (e.g., the decrypted whitelist file discussed with respect to block 76 of FIG. 3). For example, in certain embodiments, the decrypted whitelist file discussed in block 76 of FIG. 3 may be loaded into the memory 34 of the industrial controller 12 as a particular data structure, such as a hash table, which may enable fast and/or efficient searching when determining if a particular hash key value is present in the whitelist. Then, the processor 36 may allow (block 88) the executable file to execute when or if the hash key determined for the executable file is located in the decrypted whitelist file. However, the process 80 may also terminate with the processor 36 blocking (block 90) the execution of the executable file if the hash key value for the executable file is not located in the decrypted whitelist file. In certain embodiments, the processor 36 may further log (e.g., the blocked execution of the executable file as a potential security concern).

Figure 5:
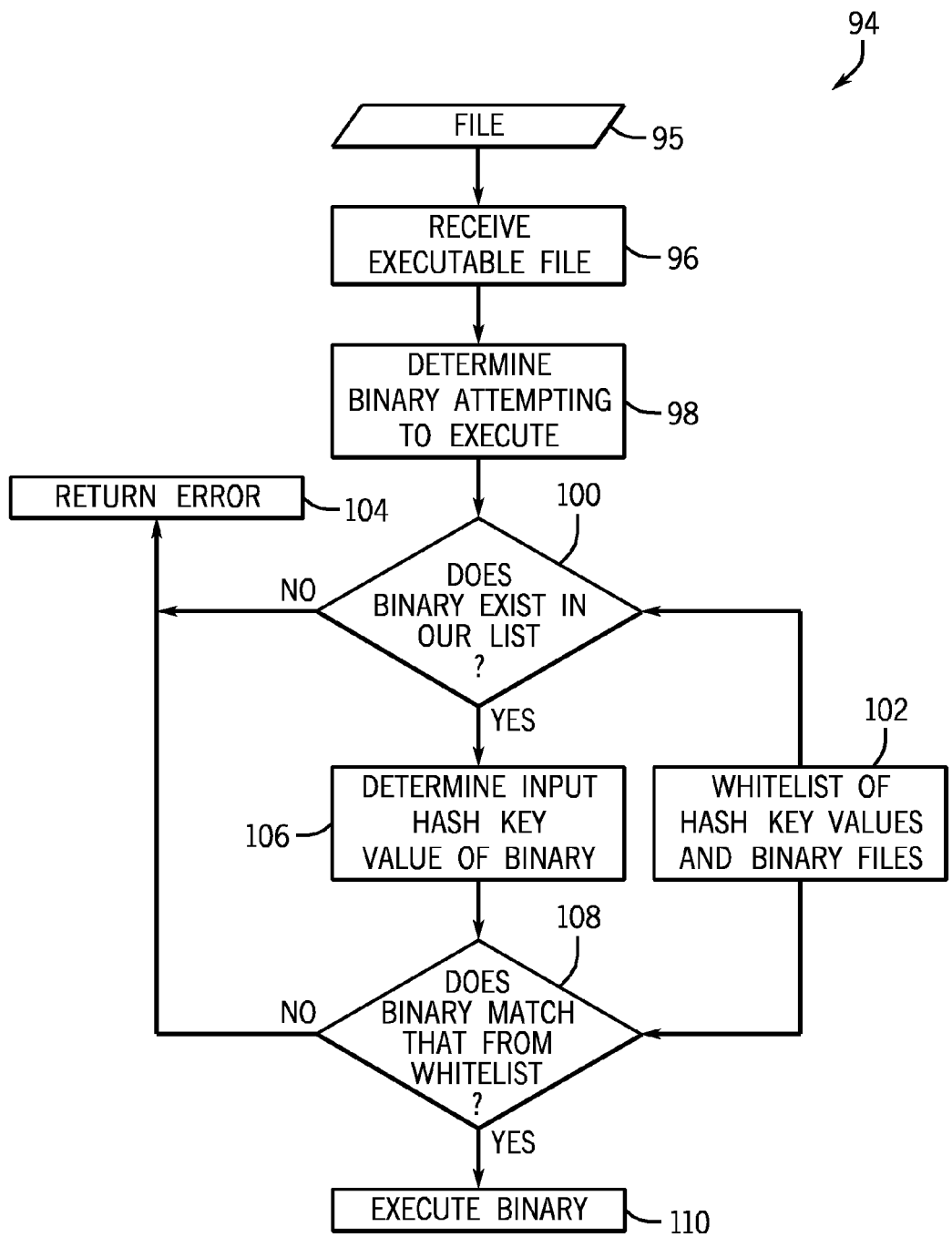
FIG. 5 is a detailed flow diagram for an embodiment of a process by which the industrial controller verifies an executable file prior to execution, in accordance with aspects of the present disclosure.

FIG. 5 illustrates a detailed flow diagram of an embodiment of a process 94 by which an executable file 95 is verified prior to execution. The process 94 may be implemented by using a non-transitory machine readable medium including code executable by the controller 12. The process 94 may begin when the processor 36 receives (block 96) the executable file 95, such as an input executable (e.g., binary) file. The executable file 95 may include executable code attempting to execute in the processor 36. The processor 36 may then determine (block 98) a binary from the executable file that is attempting to execute such that the executable file is expressed as a binary file. In one embodiment, multiple executable files may be used, and the process 94 may determine which executable binary is attempting to execute (block 98) so that it may be checked against a whitelist file, as described in more detail below. The processor 36 may then use the determined binary to decide (decision 100) whether or not the binary exists in the whitelist. The processor 36 may access a whitelist file 102 listing executable system binary files that may be approved for execution by the processor 36 in order to determine whether the determined binary exists. The system binary files are generally executable or binary files such as operating system files that exist in the operating system. If the determined binary does not exist in the whitelist file 102, then the processor 36 may return (block 104) an error. The error may result in an alert or notification that is outputted to the user through the HMI 27 or other output. Additionally, the executable file 95 may be blocked from executing. If the determined binary does exist in the whitelist file 102, then the processor 36 may determine (block 106) an input hash key value of the determined binary. It should be appreciated that the processor 36 may generally apply the same hash function as was used to determine the hash key values during the construction of the whitelist file 102 (e.g., discussed in block 60 of FIG. 2). In some embodiments, this involves passing the binary files through a secure hash algorithm to generate a 160-bit hash string. The processor 36 then decides (decision 108) whether the input hash key value matches the hash key value from the whitelist file 102. In the depicted embodiment, the input hash key value of the determined binary file is compared to the hash key value of the corresponding binary file in the whitelist file 102. If the input hash key value matches the value from the whitelist file 102, the executable file may be allowed to execute. If the input hash key value does not match the value from the whitelist file 102, the processor 36 may return (block 104) an error. The error may be an alert or notification outputted to the user. Further, the executable file 95 may also be blocked from executing. In certain embodiments, when an error is returned (block 104), the event and/or the executable file may be stored for future analysis or security reporting.

The technical effects of this disclosure include improving the security of an industrial controller of an industrial control system. That is, presently disclosed embodiments enable a processor 36 of the industrial controller 12 to verify that each executable file is authorized prior to execution. In particular, by using hash key values for the verification process of the executable files, the presently disclosed embodiments provide a light-weight system, enabling the processor 36 of the industrial controller 12 to perform this verification process with minimal impact on resources (e.g., memory space and/or processing time). Furthermore, through the use of hash key values, presently disclosed embodiments provide verification of both the content and the identity of the executable files, such that even a single bit change (e.g., due to a transmission error, file corruption, or file tampering) in the executable file would easily be detected. Accordingly, the presently disclosed embodiments provide a robust system for the detection and the blocking of unauthorized executable files from execution.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a machinery disposed on an industrial plant;
   at least one sensor disposed on an industrial plant component of the machinery;
   a hardware controller communicatively coupled to the sensor, the hardware controller configured to:
      receive at least one sensor value from the at least one sensor;
      execute an executable file that utilizes the at least one sensor value as input to the executable file to derive a control action, wherein the executable file comprises an executable binary file stored in a memory of the hardware controller;
      control a process of the industrial plant by actuating a field device based on the control action, wherein actuating the field device controls an operation of a gas turbine system of the machinery;
      retrieve a whitelist file wherein the whitelist file comprises an encrypted file stored in the hardware controller and used by the hardware controller to enable execution of commands;
      decrypt the whitelist file to derive a first hash key value;
      derive a second hash key value from the executable file;
      determine whether the executable file is listed in the whitelist file by comparing the first hash key value to the second hash key value; and
      executing, during machinery operations, the executable file to control the gas turbine based on the determination that the executable file is listed on the whitelist file.

2. The system of claim 1, wherein the hardware controller is configured to block execution of the executable file when the first hash key value does not match the second hash key value.

3. the system of claim 1, wherein the hardware controller is configured to raise an alert, raise an alarm, write to a log file, or a combination thereof, when the first hash key value does not match the second hash key value.

4. the system of claim 1, wherein the hardware controller is configured to receive a command comprising the executable file.

5. The system of claim 1, wherein a hash function is configured to derive the first hash key value.

6. The system of claim 5, wherein the hash function comprises a Cyclic Redundancy Check (CRC), a Message Digest (MD) algorithm, a Secure Hash Algorithm (SHA), or a combination thereof.

7. The system of claim 1, wherein the first hash key value comprises at least 160 bits.

8. The system of claim 1, wherein the hardware controller is configured to execute the executable file conditional on verification with the whitelist upon a request, at a predetermined time interval, at random, or a combination thereof.

9. The system of claim 1, wherein the machinery comprises the tubine system disposed on the industrial plant and configured to convert a fuel into a power, wherein the hardware controller comprises an industrial controller configured to control the turbine system.

10. The system of claim 1, wherein the whitelist comprises an encrypted whitelist and the hardware controller is configured to decrypt the encrypted whitelist.

11. The system of claim 1, wherin the hardware controller comprises a triple modular redundant (TMR) controller configured to provide redundant operations.

12. A method, comprising:
   operating, via a hardware controller, a machinery disposed on an industrial plant;
   receiving, via a sensor disposed on an industrial plant component of the machinery and communicatively coupled to the hardware controller, a sensor signal;
   executing, via the hardware controller, an executable file that utilizes the sensor signal as input to the executable file to derive a control action, wherein the executable file comprises an executable binary file;

controlling, via the hardware controller, a process of the industrial plant by actuating a field device based on the control action;

determining, via the hardware controller, an input binary by using the executable file, wherein the executable file is configured to be executed by the hardware controller, and wherein the input binary, when executed by the hardware controller, commands the hardware controller to control an operation of a turbine system of the machinery;

decrypting, via the hardware controller, an encrypted whitelist to produce a decrypted whitelist;

calculating, via the hardware controller, an input hash key value from the input binary;

determining, via the hardware controller, whether the input hash key value is included in the decrypted whitelist, wherein the decrypted whitelist comprises a plurality of hash key values calculated from a plurality of authenticated binary files, wherein the encrypted whitelist comprises an encrypted file stored in the hardware controller and used by the hardware controller to enable execution of commands; and executing, via the hardware controller, the executable file to control the turbine system when the input hash key matches one of the plurality of hash key values in the decrypted whitelist.

13. The method of claim 12, comprising blocking the executable file from executing when the input hash key does not match at least one of the plurality of hash key values in the decrypted whitelist.

14. the method of claim 12, wherein the hardware controller comprises a triple modular redundant (TMR) controller configured to provide redundant operations to the turbine system included in the machinery.

15. the method of claim 12, comprising:
determining whether the input binary matches a system binary by using a list of system binary files;
blocking the executable file from executing when the input binary does not match one of the system binary files in the list of system binary files.

16. The method of claim 12, comprising storing an execution prevention information outputting an alert, outputting a notification, or a combination thereof, when the input hash key does not match at least one of the plurality of hash key values in the decrypted whitelist.

17. A tangible, non-transitory, computer-readable medium comprising instructions configured to be executed by a processor of a hardware controller, the instructions configured to:
operate a machinery disposed on an industrial plant;
receive, via a sensor disposed on the industrial plant component, a sensor signal;
execute an executable file that utilizes the sensor signal as input to the executable file to derive a control action;
control a process of the industrial plant by actuating a field device based on the control action, wherein actuating the field device controls an operation of a gas turbine system of the machinery;
decrypt an encrypted whitelist to provide a decrypted whitelist;
determine an input hash key value for an input binary file, wherein the input binary file of the executable file, when executed by the hardware controller, commands the hardware controller to control an operation of the gas turbine system of the machinery; and
block execution of the input binary file when the input hash key value is not found in the decrypted whitelist, execute the input binary file when the input hash key value is found in the decrypted whitelist; wherein the decrypted whitelist comprising a plurality of hash key values, and wherein the encrypted whitelist comprises an encrypted file stored in the hardware controller and used by the hardware controller to enable execution of commands.

18. The computer-readable medium of claim 17, wherein the instructions are configured to execute the input binary file when the input hash key value is found in the decrypted whitelist.

19. The computer-readable medium of claim 17, wherein the instructions are configured to determine the input hash key value for the input binary file by using a Cyclic Redundancy Check (CRC), a Message-Digest Algorithm (MD), a Secure Hash Algorithm (SHA), or a combination thereof.

* * * * *

UNITED STATES PATENT AND TRADEMARK OFFICE
CERTIFICATE OF CORRECTION

PATENT NO. : 8,959,362 B2
APPLICATION NO. : 13/460771
DATED : February 17, 2015
INVENTOR(S) : Pettigrew et al.

Page 1 of 1

It is certified that error appears in the above-identified patent and that said Letters Patent is hereby corrected as shown below:

Title page, item (56), under "FOREIGN PATENT DOCUMENTS", in Column 2, Line 1, delete "10/1999" and insert -- 01/1999 --, therefor.

Claims

In Column 10, Line 28, in Claim 3, delete "the system" and insert -- The system --, therefor.

In Column 10, Line 32, in Claim 4, delete "the system" and insert -- The system --, therefor.

In Column 10, Line 48, in Claim 9, delete "tubine" and insert -- turbine --, therefor.

In Column 10, Line 55, in Claim 11, delete "wherin" and insert -- wherein --, therefor.

In Column 11, Line 31, in Claim 14, delete "the method" and insert -- The method --, therefor.

In Column 11, Line 35, in Claim 15, delete "the method" and insert -- The method --, therefor.

Signed and Sealed this
Seventeenth Day of November, 2015

Michelle K. Lee
*Director of the United States Patent and Trademark Office*